United States Patent [19]

Hochandel et al.

[11] 4,264,634
[45] Apr. 28, 1981

[54] METHOD FOR APPLYING GRATED CHEESE TO PIZZA SHELLS

[75] Inventors: Thomas A. Hochandel; Richard A. Meyer, both of Columbus, Ohio

[73] Assignee: J. E. Grote Pepp-A-Matic Co., Inc., Columbus, Ohio

[21] Appl. No.: 970,522

[22] Filed: Dec. 18, 1978

Related U.S. Application Data

[62] Division of Ser. No. 845,736, Oct. 26, 1977, Pat. No. 4,145,990.

[51] Int. Cl.³ .............................................. A23L 1/00
[52] U.S. Cl. .................................. 426/289; 426/291; 426/293; 426/296
[58] Field of Search ............... 426/289, 291, 293, 296; 222/486; 118/680; 99/450.1

[56] References Cited

U.S. PATENT DOCUMENTS

| | | | |
|---|---|---|---|
| 3,358,618 | 12/1967 | Vetta | 222/486 |
| 3,648,596 | 3/1972 | Zito | 425/217 |
| 4,112,834 | 9/1978 | Thiry | 99/450.1 |

Primary Examiner—Joseph M. Golian
Assistant Examiner—Elizabeth A. Hatcher
Attorney, Agent, or Firm—Robert E. Stebens

[57] ABSTRACT

A method for application of grated cheese to pizza shells is provided including feeding of cheese to a grating station, intermittent grating of the cheese to produce a predetermined quantity of grated cheese particles in a selected pattern and permitting the particles to freely drop, receiving the grated particles in a plane in the pattern as dropped and then discharging the particles from that plane, along a fixed line while transporting a pizza shell relative to the fixed discharge line in a direction perpendicular thereto to thereby collect the particles in the same specific pattern on the pizza shell. This method enables forming of the particles at a stationary point and to then place those particles in the same pattern on a pizza shell which is continuously moving.

6 Claims, 7 Drawing Figures

METHOD FOR APPLYING GRATED CHEESE TO PIZZA SHELLS

This is a division of application Ser. No. 845,736, filed Oct. 26, 1977, now U.S. Pat. No. 4,145,990.

BACKGROUND OF THE INVENTION

The method and apparatus of this invention for the application of grated cheese to pizza shells is a specific application of this apparatus and method. It will be readily apparent that the apparatus is also equally suitable for the automated application of other food products in particle form to other types of suitable receiving units, such as edible food products or simply appropriate containers for the storage and retention of such grated food particles.

The specific objective of this invention is the provision of suitable apparatus and technique of operation to effect the further automated placement of a layer of particles of the grated food product onto the upper receiving surface of a pizza shell in a predetermined area configuration and layer thickness in effectuating an automated production line manufacture of pizza. Specifically, the apparatus is designed for utilization by food processors who form and fabricate pizzas for sale in a frozen form suitable for subsequent baking by the ultimate consumer. While it is this specific utilization to which the invention is directed, it will be readily understood that the invention and the technique of performing the operations will be equally adaptable to other situations in connection with the production of pizzas and can easily include producers of pizzas in a completely baked form ready for consumption. It will be readily apparent that the specific application and utilization will be determined by the economics of the situation and will be particularly desirable where the production capacity required at a particular location warrants the expense and cost of an automated machine when compared with the high labor costs normally associated with large quantity production facilities.

With respect to the production of pizza, the most common and reliable production techniques heretofore utilized involve a substantial amount of manual labor in the application of the various food products to the surface of the pizza shells. Such large production capacity facilities often utilize conveyor lines but individual personnel are utilized at the respective stations, for the application of the tomato sauces, sliced meats, cheeses and other food products, such as mushrooms or anchovies, in the sequential formation of the surface layers on a pizza shell. The disadvantage of such manual procedures is that the uniformity of the end product is difficult to control. Each individual person introduces a minor variation even though particular control techniques are utilized. Such control techniques may be the use of measuring devices, such as scoops, cups or other types of containers which enable the operator to utilize, with a degree of uniformity, a specific amount of a particular product that is to be distributed on the surface of a pizza.

While these techniques do provide a certain degree of control and uniformity in the end products as to the quantities, there still remains a substantial variation in the amounts of materials that may be applied. More particularly, there will be a substantial variation in the arrangement and location of the allotted quantity of any particular food product that may be initially accurately measured. This is particularly true in a case of the application of grated cheeses. Grated cheese must necessarily be supplied to operating personnel in grated form as the time factor does not permit grating by the operator immediately prior to application. Grated cheese, however, due to the inherent characteristics of cheeses, has a tendency to form into a conglomerate mass that is difficult to separate without expenditure of a substantial amount of time and effort on the part of the operator, and which generally not entirely successful. It is also nearly impossible to grate the cheese and provide it in a state where the operating personnel may readily separate the grated particles which are in strips, shreds and other smaller particles, to enable the operator to evenly distribute those particles in a desired uniform thickness pattern over the surface of the pizza and to ultimately achieve the desired uniform quality in appearance and taste. Such a time expenditure represents a material cost factor in the high capacity production facilities and is, therefore, an important factor that is always present in the economic considerations of manual grated cheese application procedures. As indicated, these manual operation techniques represent a substantial cost factor and inherently prevent minimizing production costs to maintain a competitive wholesale or retail price of the completed pizza. Another important factor in the economic cost is the substantial loss in the grated cheese products that occurs during such manual application procedures. Any cheese particles which are not initially placed on the upper surface of the pizza shell, are of necessity, a waste product that cannot be reused due to the requirements of health standards and statutory sanitation requirements for food producers.

Mechanized apparatus has been heretofore devised in attempts to provide automated pizza production facilities which include the application of grated cheeses to pizza shells. An example of such prior efforts is disclosed in U.S. Pat. No. 3,358,618 issued to M. J. Vetta on Dec. 19, 1967. The apparatus disclosed in that patent includes a cheese receiving hopper which is provided with a grating mechanism at its lower or bottom end from which the grated cheese is discharged. The cheese is placed within this hopper and a vertically downward force is applied to the cheese to place a compressive force on the cheese thereby continuously urging the cheese against a grating plate. This grating plate is intermittently revolved, with respect to the cheese which is held stationary, as determined by the location of a pizza shell beneath the grating apparatus. The disadvantage of this apparatus, however, while it appears capable of adequately grating cheese by a mechanism and deposit directly onto a pizza shell, is that such mechanisms require intermittent operation of an underlying conveyor which transports the pizza shells below grating apparatus. Such intermittent conveyors are undesirable as it requires that all further food product applicators associated with the production of pizzas, also be intermittently operated in specific timed relationship to each other component. Specifically, the pizza shell transporting conveyor must be operated to place a respective shell beneath the grating apparatus and to then maintain the position of the pizza shell during the cheese grating and application procedure. This is true whether the apparatus utilizes a conveyor or is a semi-automated apparatus where operating personnel are still utilized to position pizza shells in association with the mechanism to receive the grated cheeses. A further disadvantage of such mechanisms is that the cheeses, as they are grated, are deposited in precisely the same area configuration as the cheese supplied. Cheese supplied for the purpose of fabricating pizzas is normally in the form of elongated blocks of rectangular cross-section. Accordingly, even utilizing multiple blocks to provide an adequate area of coverage only results in the formation of a similarly shaped area of such grated cheeses. The rotation of the grating device itself does not provide the desired control over the selected and desired area of coverage. Incorporation of funnels or other particle directing devices does not readily enhance the uniformity of the distribution of the food products and particles as they are grated. In fact, those elements often seriously impede the gravity feeding procedures due to the inherent adhesion characteristics of the cheese particles which ultimately tend to build-up and form on the interior surfaces of any such directing or funnel devices. Ultimately, the apparatus must be stopped for cleaning for continuation of the operation.

SUMMARY OF THE INVENTION

In accordance with this invention, a method and apparatus is provided for the automated application of grated cheese to the upper surfaces of pizza shells or other similar receptacle or receiving surfaces which overcomes the disadvantages of the manual operating techniques heretofore utilized as well as the disadvantages of the machine mechanisms heretofore utilized in such operations. The apparatus of this invention is particularly adopted for association and operation with a continuously moving production line including a conveyor along which pizza shells are continuously transported in relatively spaced sequence. The cheese grating apparatus provided is supported vertically above a section of the conveyor over which the pizza shells are longitudinally displaced and can be designated a food particle application station. This grating apparatus is selectively operable to deposit a layer of grated cheese in a predetermined pattern and layer thickness onto an underlying intermediate transfer conveyor that includes a continuous belt. The transfer conveyor receives the cheese particles as they are discharged and drop from the grating apparatus and retains those particles until the transfer conveyor is operated to discharge and deposit an accumulation of particles onto a pizza shell which is moving longitudinally along the predetermined path below the transfer conveyor. Utilization of the intermediate transfer conveyor provides the means essential for effecting selective control over the formation of the desired particle pattern and layer thickness. Such control cannot be effected through the direct deposit techniques of the apparatus heretofore utilized in such production facilities such as in conjunction with a continuously moving production line.

The grating apparatus of this invention is of a type which revolves a quantity of food product or block of cheese against the stationary or fixed grating plate. This apparatus is of particular advantage in that it enables and provides a means for control in the formation of the desired area and configuration. The cheese, as it is revolved, sweeps a predetermined area of the grating plate that may be formed so as to either deposit the grated cheese in a layer over a circular area or it may be so configured as to permit grating of cheese in other selected area configurations, such as rectangular or square. The cheese, as it is revolved, is also compressed forcibly onto the grating plate with a predetermined force to maintain the desired uniformity in the amount of material that may be removed from the cheese block during any predetermined angular displacement of that block. This compressing force is of further advantage in that it maintains a uniformity in the distribution of the cheese within the product carrier during such grating operations to further enhance the uniformity in formation of a predetermined layer of particles for ultimate deposit onto the upper receiving surface of a pizza shell.

Further automated operation of the apparatus is effected by the provision of a magazine feeding mechanism for the block of cheese. This mechanism is operated in controlled response to the detection of a minimum quantity of cheese within the grating apparatus to effect insertion of another charge or quantity of cheese into that apparatus for continued operation. The automated magazine feeding is effected in timed and controlled relationship to the operation of the grating apparatus to feed a predetermined quantity of cheese into that apparatus during each charging operation.

Appropriate control devices and sensors are incorporated in the mechanism fore effectuating the precise timed relationship of the operation of the several components. Specifically, detection means if provided for the sensing of the approach of a pizza shell to the zone of transfer with respect to the intermediate transfer conveyor. That sensor then actuates the appropriate control and drive mechanisms to prevent further operation of the grating apparatus, assuming that the grating apparatus has completed its cyclic operation, and initiate operation of the transfer conveyor to deposit the previously received particles onto the pizza shell. Additional sensing elements are provided for the timed and sequential operation of the grating apparatus and the detection of the presence of a minimum quantity of cheese in the grating apparatus to initiate operation of an automated magazine feeding procedure.

These apparatus and mechanisms, as utilized in the method of this apparatus, provide for the advantageous automated application of a grated food product to an article such as a pizza shell. The apparatus is controlled to apply a highly desired uniform layer of food particles in the most advantageous and desirable area or pattern. The end product has a high degree of uniformity and pleasing appearance for a greatly improved sales position. Economics of operation are greatly improved through a substantial reduction in wasting of cheese or food products during the operation.

These and other objects and advantages of this invention will be readily apparent from the following detailed description of an illustrative embodiment thereof and the accompanying drawings.

DESCRIPTION OF THE DRAWING FIGURES

DESCRIPTION OF THE ILLUSTRATIVE EMBODIMENT

Figure 1:
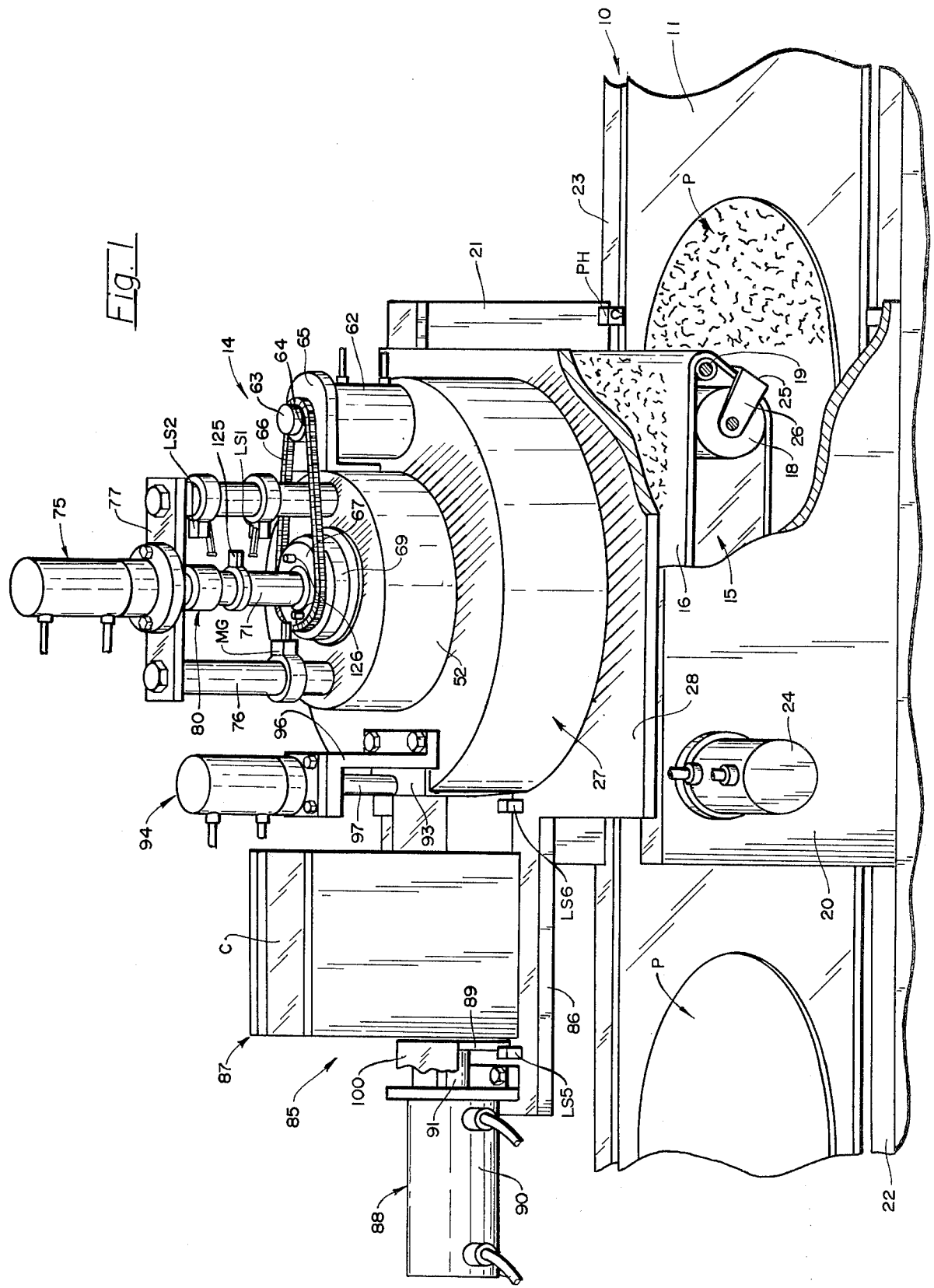
FIG. 1 is a perspective view of a cheese grating apparatus embodying this invention and operable in accordance with the method thereof.

Having reference to the several figures of the drawings, there is illustrated an embodiment of the apparatus for the grating of cheese and depositing of the resultant cheese particles onto a food product such as a pizza shell. For best illustrating the advantageous operation and functioning of the inventive apparatus, this apparatus is shown as positioned in operative relationship to a continuous conveyor 10 on which the pizza shells P are transported from one station to another. This continuous conveyor 10 includes the illustrated upper and lower runs 11 and 12 with the upper run 11 shown as being supported by suitable means (not shown) for its continuous movement along a substantially horizontal plane. As shown in the drawings, the conveyor is illustrated as a large flat belt but it will be understood that other types of conveyors may also be utilized such as the innerconnected link rod type, or open mesh structures. It will also be understood that suitable drive means would be provided and mechanically coupled with the belt for continuously revolving the conveyor in the direction indicated in FIG. 2.

Figure 2:
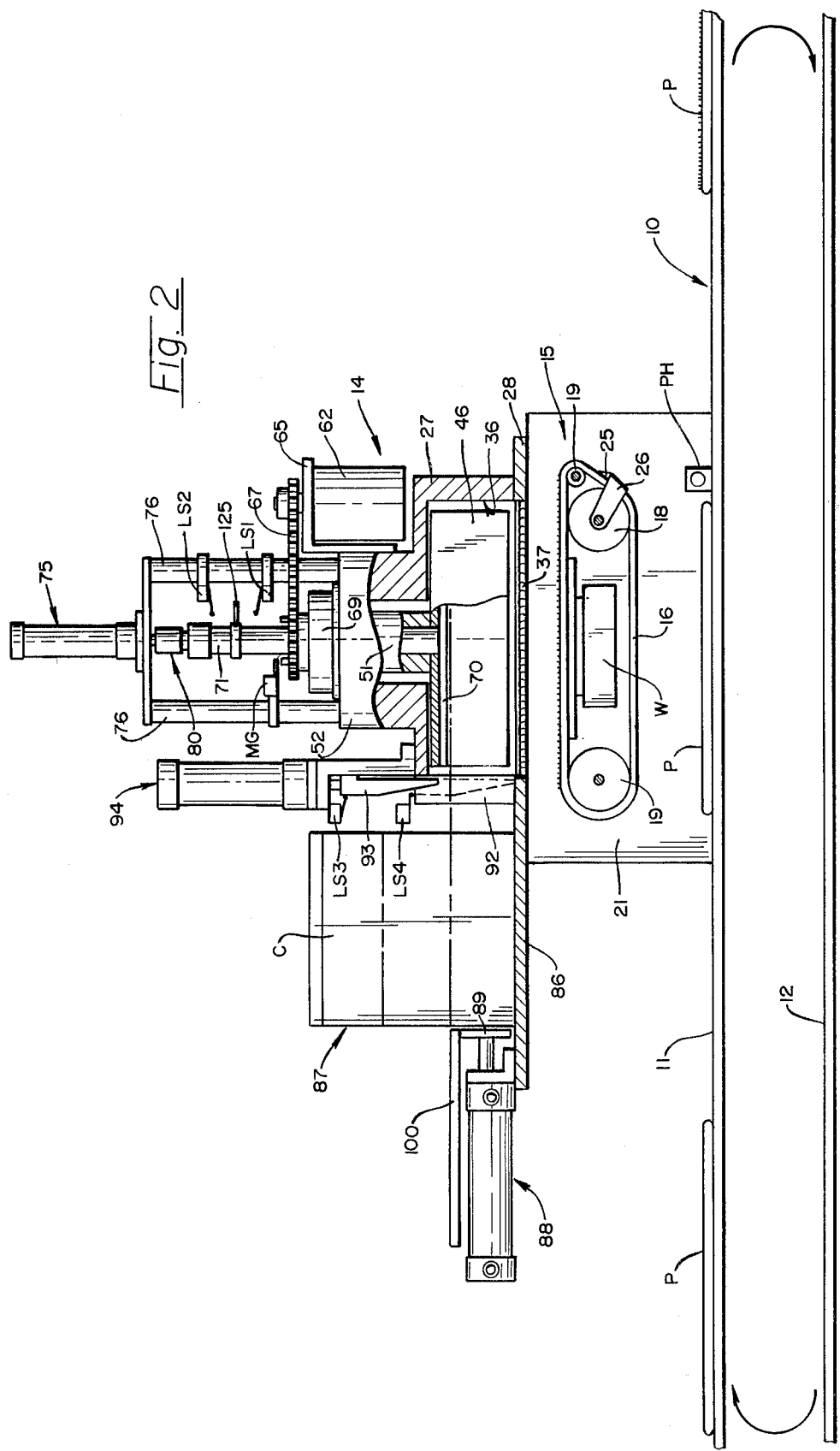
FIG. 2 is a medial longitudinal vertical sectional view thereof.

In FIGS. 1 and 2, only a small number of pizza shells P are illustrated but this number is sufficient to indicate the relatively spaced relationship in which the shells would normally be placed on the belt or conveyor for the sequential transport through the various stations of a pizza production facility and including this apparatus. It will also be noted that these pizza shells comprise relatively thin layers of a dough-like product which may be either self-supporting or may be positioned on a receiver tray of transport plate. Such specifics are not illustrated as they will be determined in accordance with a particular producers' operations and the resulting packaging that may be required. It will also be noted that the pizza shells P are illustrated as being of the conventional circular shape but it will be understood that other shapes of pizza shells such as square or rectangular, may be utilized and also that different types of food-product receiving trays or elements may be advantageously utilized with the apparatus of this invention and in accordance with the operating technique. The circular pizza shells P are illustrated to provide the basic indication of the primary field of utilization of the invention apparatus and method.

Figure 4:
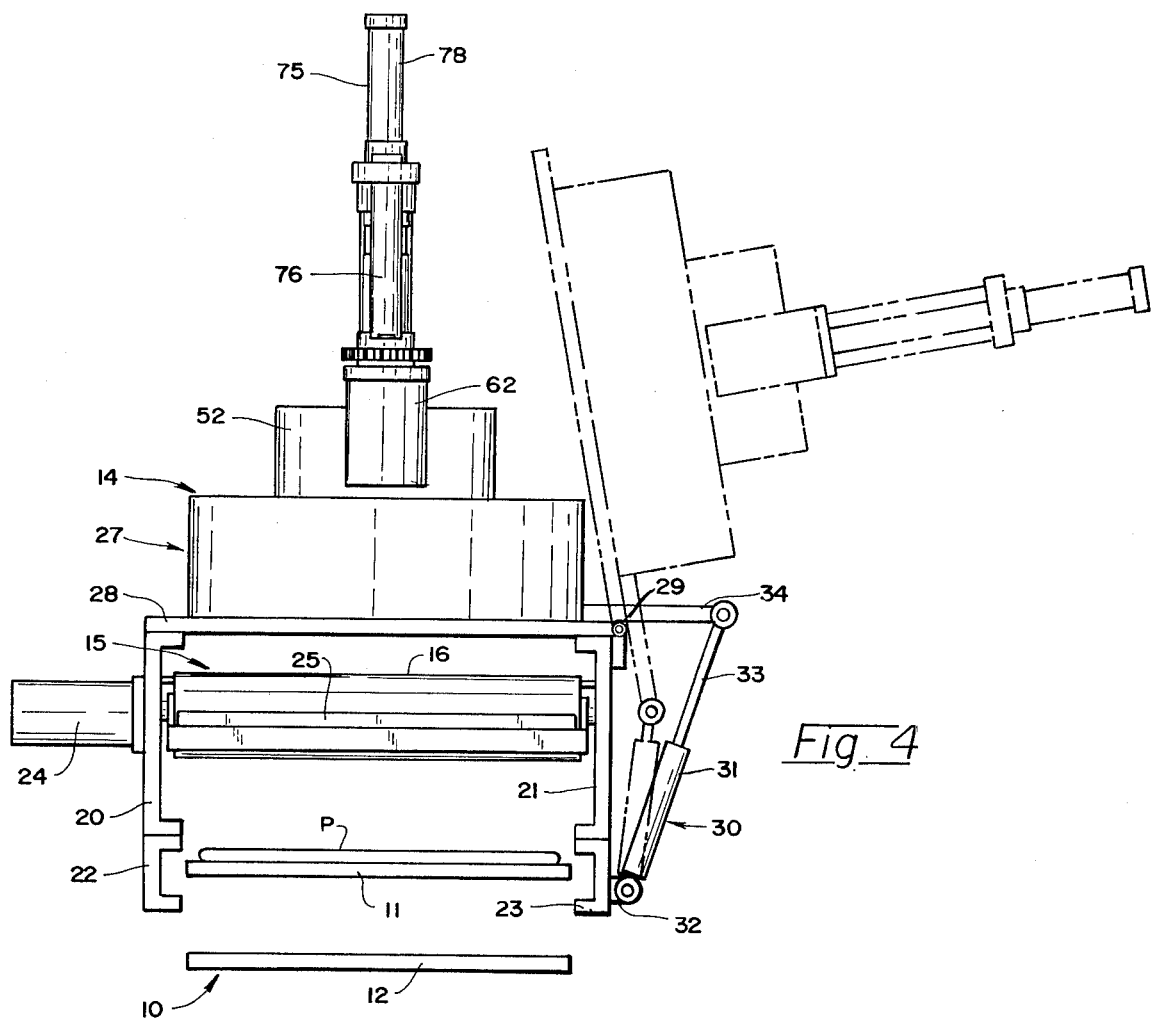
FIG. 4 is a tranverse vertical sectional view taken along lines 4—4 of FIG. 2.

Positioned at a food particle application station and supported in vertically superimposed relationship to the conveyor 10 is a grating means 14 and an intermediate transfer conveyor 15. The intermediate transfer conveyor 15 comprises a continuous belt 16 which is suported in intermediate relationship between the grating means 14 and the upper conveyor run 11. This continuous belt 16 is supported by a set of drive and support rollers 17, 18 and 19 to maintain this conveyor in longitudinally aligned relationship to the main conveyor 10 but in vertically upwardly spaced relationship thereto. Each of the rollers 17, 18 and 19 may be advantageously journelled in suitable bearing structures that are not specifically shown but are carried by upstanding plates 20 and 21 of the supporting framework. These plates 20 and 21 may be secured at their lower end portions to other structural elements of the conveyor apparatus and supporting frames. These other supporting elements and frames are best seen in FIG. 4 as including a pair of longitudinally extending channels 22 and 23 which extend parallel to the upper run 11 of the primary conveyor 10. These channels 22 and 23 are spaced apart a distance sufficient to accept the conveyor 10 and permit transport of the pizza shells P along the upper run thereof. Each of the upstanding plates 20 and 21, as can also be best seen in FIG. 4, may comprise a pair of flanges at the upper and lower longitudinal edges thereof which form supporting surfaces. The lower flanges of each of the respective plates are rigidly secured to the respective channels 22 and 23.

Connected to the drive roller 17 is a rotary power device 24 which is selectively operable to provide the necessary rotary motion for the intermittent displacement of the intermediate conveyor belt 16. In this illustrative embodiment of the invention, the rotary power device 24 may advantageously comprise a hydraulic actuated motor which is mounted on the vertical plate 20 and is coupled with the shaft of the drive roller 17. A suitable hydraulic power source would necessarily be provided although such a device is not illustrated in the drawings other than in the schematic diagrams. Specific devices that would be suitable are well-known and it is not deemed necessary to otherwide illustrate or describe such devices to fully disclose this invention and its opertion. Also, innerconnection of the hydraulic motor 24 with appropriate fluid conduits and control mechanisms is not illustrated in mechanical detail. These innerconnections, however, are shown in the schematic diagram figures directed to the control circuits and control mechanisms.

The drive and support rollers 17 and 18 are of the same diameter and extend essentially transversely across the entire width of the upstanding plates 20 and 21. As previously indicated, these plates are spaced apart in a transverse direction a sufficient distance to accept the full width of the conveyor 10 and any associated pizza shells P that may be transported thereon. Similarly, the intermediate conveyor belt 16 is also of substantially the same width as can be best seen in FIG. 4, to permit functioning of the apparatus with a pizza shell or other product or article of a similar size and transported by this conveyor 10. These rollers 17 and 18 are also seen to be positioned to maintain the intermediate transfer conveyor belt 16 with upper and lower horizontally extending runs and for movement in parallel and longitudinally aligned relationship to the primary conveyor 10. Also incorporated in this structure is an auxiliary support roller 19 that is journaled on the plates 20 and 21 at a position that, for convenience, can be termed the trailing end of this conveyor. By trailing end, this is intended to indicate a relative direction of movement of the particular conveyor. The function of this auxiliary support roller 19, which is of a substantially smaller diameter than the other two rollers, is to form a relatively sharp and well defined drop off edge for the grated or shredded food particles that may be deposited on the upper run of the intermediate conveyor. The smaller the diameter of this roller 19, the sharper the cutoff and resulting improvement in ability to drop the particles along a precisely defined line. Positioning of this auxiliary roller 19 so as to be tangent to the upper run of the intermediate conveyor belt 16 results in the desired precise deposit of the food particles on the underlying and relatively moving pizza shell in the same pattern and configuration as originally deposited on the intermediate conveyor although in reversed orientation.

Also associated with the intermediate transfer conveyor 15 is a scraper blade 25 which is carried by suitable mounting brackets 26. The scraper blade 25 is designed and positioned to extend transversely across the face of the conveyor belt 16 at a location in trailing relationship to the downwardly turning portion of the belt 16 between the auxiliary roller 19 and the trailing primary support roller 18. The function of this scraper blade 25 is to assure that food particles carried on the conveyor belt and tending to adhere thereto, will be completely cleared and deposited onto the underlying pizza shell. It will be apparent from the location of this scraper blade, however, that those particles which remain adhered to the surface of the belt and are removed by the scraper blade will not be deposited in the preferred position but will be relatively close thereto. Additionally, the number of particles that may remain adhered to the belt will be relatively small with appropriate selection of the belt material and thus, will not seriously effect the formation of a desired pattern of food particles or the thickness of that layer.

The functioning of the intermediate transfer conveyor 15 is that it is intermittently driven by its associated and interconnected motor 24 in accordance with the commands of the automated control system. At a particular instant in the operational sequence, the intermediate transfer conveyor 15 will be stationary and the particles of grated cheese, or other shredded particles of a food product, will be deposited in a layer upon the upper run of that belt 16 which forms a planar surface. As will be explained hereinafter, these particles are deposited in a predetermined pattern for a particular area coverage and will be of a predetermined layer of thickness for the quantity of such particles as determined appropriate for the specific food article. As the primary conveyor 10 continues its movement of longitudinally displacing a pizza shell underneath the intermediate conveyor, an extreme end, or leading end of the pizza shell, will be sensed by the control apparatus sensors and result in acutation of the apparatus to activate the conveyor drive motor 25 for revolving the belt 16. This intermediate conveyor belt is revolved in the direction indicated by the arrows in FIG. 2, and the food particles which had been previously deposited on the upper run of that belt and retained in a fixed layer, will then be deposited along a transverse line onto the pizza shell as it traverses this receiving area. The objective achieved by this mechanism is that the pattern and layer of the food particles is repeated in a very precise manner onto the receiving surface of the pizza shell or other article. It is this particular functioning and operation of the intermediate conveyor that enables this apparatus to function in the highly desired manner of forming the preferred pattern with the desired degree of uniformity of the food particles on the ultimate food product. The tendency of food particles in shredded form, such as cheese, to adhere to each other is of no consequence as the particles are in the desired pattern and it is essentially immaterial that some particles may be stuck together. It will also be readily understood that a pattern, or area configuration of the initially deposited food particles on the intermediate conveyor, will be repeated in the same manner as these particles are merely dropped along a single line at this receiving area and thus enables the apparatus to accurately repeat the pattern. The rate of movement of the intermediate conveyor 16 is coordinated with the primary conveyor 10 so that the food particles are transferred from a point-to-point position and thus repeat the desired and intended pattern.

As previously indicated, positioned immediately above the intermediate transfer conveyor 15 is the grating means 14. This grating means 14 is uniquely designed and configured in accordance with the objectives of this invention to enable one to selectively deposit a predetermined pattern or area of coverage of food particles. These food particles can be altered and controlled as to size and configuration in accordance with the specific grating plate that may be installed in a particular apparatus.

Forming the basic structure of the grating means 14 is a cylindrically shaped housing 27. This housing 27 is mounted on a base plate 28 which in turn is carried on the uppermost flanges extending horizontally along and formed with the vertical support plates 20 and 21. In accordance with this invention, as can be best seen in FIG. 4, one longitudinally extending edge of the supporting plate 28 is preferably secured to the one plate 21 by a hinge structure 29. This hinge structure 29 is oriented to enable the entire grating means to be pivoted between the two positions indicated in FIG. 4 to facilitate cleaning and mechanical adjustment of the grating means. For this purpose, a mechanical actuating device may be advantageously provided to eliminate the necessity to otherwise provide a substantial manual effort in pivoting the grating means 14 to the position indicated indicated in broken lines as well as subsequently maintaining the structure in that position without danger to operating personnel who may be repairing or cleaning the equipment. Accordingly, a hydraulic ram actuator 30 is provided. This hydraulic ram includes a cylinder 31 which is pivoted at its one end on a hinge bracket 32 that is fixed to the one longitudinal channel 23. Projecting upwardly from the cylinder 31, is an elongated piston rod 33 which is pivotally connected to lever arm 34 secured to the supporting plate 28. Consequently, extension or retraction of the piston rod 33 with respect to the cylinder 31 will effect pivoting movement of the grating means 14 between the two illustrated positions. Control and operation of the hydraulic ram 30 is diagrammatically illustrated in the circuit schematic for the control systems and circuit and as further described hereinafter.

Figure 3:
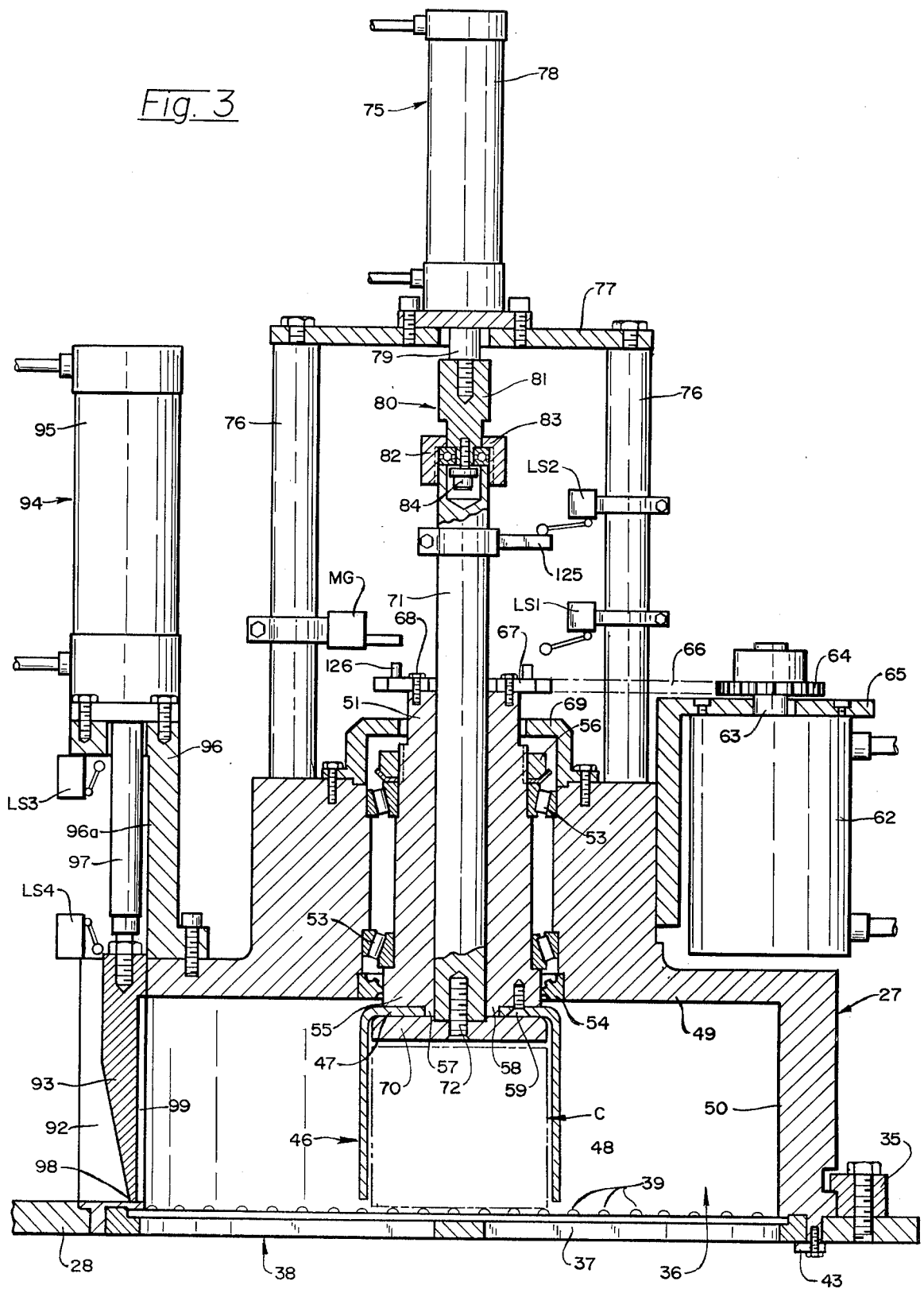
FIG. 3 is a vertical sectional view of the grating apparatus proper on a substantially enlarged scale.
Figure 5:
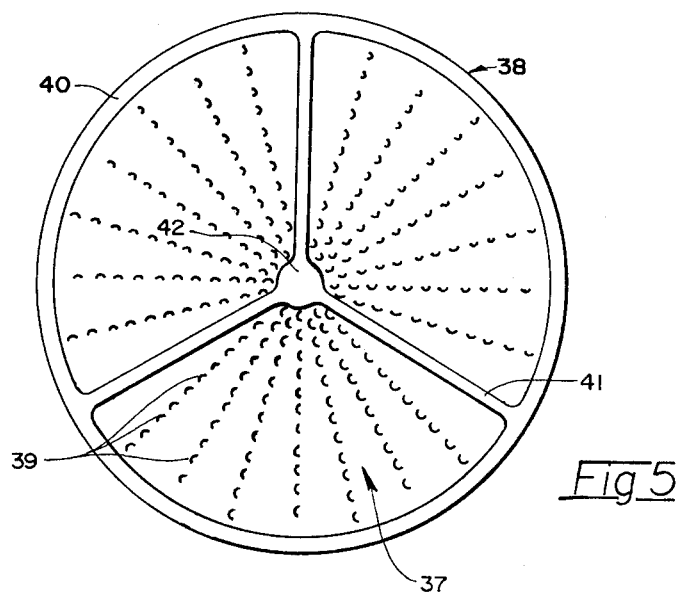
FIG. 5 is a plan view of the grating plate and its support ring.

The housing 27 is mechanically secured by suitable fastening means 35 to the base plate. These fastening means 35 enable the apparatus to be disassembled to facilitate cleaning as may be required or necessary in accordance with the applicable sanitary codes and health standards. The housing 27, as indicated, is of a cylindrical configuration and defines an interior cylindrical chamber 36 in which a quantity of cheese or other food products to be processed, is positioned for the grating operation. Positioned in the bottom end of the cylindrical chamber 36 is a grating plate 37 which is secured and supported in this position by a retaining ring 38. In accordance with this invention, the grating plate 37 is formed from a relatively thin sheet of metal and has formed therein a substantial number of upwardly projecting cutting or tearing elements 39 which are associated with respective apertures that are formed in the plate during formation of the elements. These upwardly projecting elements 39 are configured in a manner to best provide the desired grating operation and produce the food particles of the size, shape and configuration that is preferred for a particular intended utilization or food product. As can be best seen in FIG. 5, this grating plate is provided with a number of elements 39 arranged in specific geometrical relationship such that the revolving of a quantity of the food product in contacting engagement with the upper surface of the plate 37 will effect the necessary and desired formation of the shredded or other forms of particles that are discharged from the lower side of the grating plate. The retaining ring 38 is of minimal surface area to prevent restriction or obstruction to the formation of the food particles as discharged from the grating plate. In this illustrative embodiment, this retaining ring comprises a circular ring 40 that includes three spokes or radially extending arms 41 that are mutually interconnected at the center or hub 42 of this ring. The width of the arms 41, as well as the central interconnecting hub 42, are maintained with a minimal area of configuration to minimize their obstruction to the formation and discharge of the food particles. Suitable clamping devices 43 are also provided to maintain the retaining ring 38 and its associated grating plate 37 in the illustrated assembled position as shown in FIGS. 2 and 3.

Positioned within the interior chamber 36 of the housing 27 is a food product holder 45 which, in accordance with this invention, are particularly designed for utilization with elongated blocks of cheese that are usually of a rectangular or square cross-section. This holder 45 comprises an elongated U-shaped channel 46 which is supported in an inverted position within that chamber. This channel 46 includes a horizontal web portion 47 and depending, vertically disposed flanges 48 and is of a length to extend diametrically across the chamber 36. Each of the flanges 48 is of a height to extend substantially between the upper wall 49 of the chamber 36 and the upper portion of the grating plate 37. It will be noted in FIG. 3 that the lower horizontal edges of the flanges 48 are supported so as to provide positive clearance with respect to the upwardly projecting grating elements 39. The opposed longitudinal ends of the flanges 48 terminate in closely adjacent relationship to the interior cylindrical wall surface 50 of the chamber as best seen in FIG. 2 as does the web 47. With this arrangement it will be seen that the food product holder 45 is thus capable of substantially enclosing a quantity of the food product which is indicated in FIG. 3 by the letter C as designating a block or blocks of cheese. When thus totally enclosing the food product in this manner, it is possible through revolution of the channel 46 about a central vertical axis to cause the food product C to bear against and to be operated upon by the upwardly projecting elements 39. This relative rotational movement, with respect to the grating plate, thus results in shreds or particles of the food product being torn from the lower surface of the otherwise enclosed block of food product and discharged through the apertures associated with the respective upwardly projecting elements 39.

Support of the channel 46 of food product holder 45 is accomplished by a relatively large diameter shaft 5 which is vertically positioned and journaled in an upward directed extension 52 of the housing 27. This extension 52 is provided with a set of roller bearings 53 which carry the shaft 54 for its rotational movement. A suitable sealing element 54 is also mounted in the extension 52 at the lower end adjacent the upper wall 49 of the grating chamber. This sealing element 54, which is carried by the housing, projects into sealing engagement with a peripheral annular rib 55 formed on the shaft and is designed to assure that no food products or particles will either be extruded through the bearing housing itself or permit any other contaminant from entering into the grating chamber. A thrust-ring 56 is threaded onto the upper end of the shaft 51 and bears against the upper bearing 53 to vertically support the shaft. Secured to the lower end of the shaft 51 which projects slightly into the interior of the chamber, is the U-shaped channel 46. This channel 46 is provided with an aperture 57 formed in the web 47 that receives and interfits with an axially projecting boss 58 to serve as a fixed locater for the channel 46. Fastening means, such as the flat headed screws 59 are also provided for mechanically securing the channel to the end of the shaft 51.

Rotational movement of the shaft 51 is effected by a hydraulic motor 62 provided with a vertically extending output shaft 63 carrying a gear-type sprocket wheel 64. The motor 62 is mechanically secured to the upper extension 52 of the housing by an L-shaped bracket 65 which is bolted thereto. A driving connection from the sprocket 64 to the shaft 51 is provided by a chain 66 which extends around the sprocket 64 and a cooperative sprocket gear 67 which is bolted to the upper end of the shaft 51. Attachment of the sprocket gear 67 to the shaft 51 can be conveniently accomplished by means of the cap screws 68 which are threaded into sockets formed in the upper end of the shaft. The hydraulic motor 62 is designed to be operated in accordance with the control system, as shown in the schematic control circuit diagrams and is operative to revolve the shaft 54 and its innerconnected and supported channel 46 to achieve the desired grating operation.

Protection and sealing of the upper end portions of the shaft 51 is accomplished by a cylindrical cap 69 that is positioned over the bearing housing and has an aperture through which the upper end portion of the shaft 51 projects for attachment of the gear 67. This cap 69 is bolted to the upper extension 52 of the housing and minimizes the possibility of entrance of possible contaminating articles and debris into the bearing housing to better assure that such contaminants will not likely result in the consequent contamination of the food products.

In accordance with this invention, it is important that a constant and uniform force be applied in a vertically downwardly direction to the food products C that are contained within the U-shaped channel 46. This is necessary to assure that the food product will be subjected to a uniform grating operation and thereby result in the formation of constant predetermined sized particles or shreds of particles of food that may be produced by the rotational movement of the food holder 45 in cooperation with the grating plate 37. A proper downward pressure is obtained by means of a pressure plate 70 which is disposed within the channel 46. This pressure plate 70 extends the entire length of the channel 46 and the extreme ends thereof may be arcuately curved in conformity with the interior cylindrical wall 50 of the chamber 36. This plate also extends laterally between the flanges 48 of the channel 46 and thus bears against the entire upper surface of the food product C that is contained within the channel 46. Supporting the pressure plate 70 is an elongated shaft 71 which extends coaxially through the large diameter shaft 51 carrying the food products channel 46. This shaft 71 is mounted in a central, coaxial passage formed in the shaft 51 for axial displacement with respect thereto. With this mounting of the shaft 71 having the pressure plate 70 mechanically secured thereto by a flat headed cap screw 72, it will thus be seen that application of an axially directed force to the shaft 71 will enable application of a compressive force to the product through the pressure plate 70 that is in contact with the upper surfaces of that food in the channel 46.

Application of the desired compressive force is obtained through a hydraulic ram 75 disposed in coaxially alignment with the shaft 71. The ram 75 is supported by a pair of upstanding posts 76 which are secured at their lower ends to the housing extension 55. Extending across the upper ends of the posts 76, is a mounting bar 77 and it will be noted that the posts 76 are located to support the bar 77 in diametrical relationship to the shaft 71. Secured to the bar 77 is the hydraulic ram 77 which includes a cylinder 78 that is vertically oriented and includes an axially displaceable piston rod 79. Mechanical interconnection of the piston rod with the shaft 71 is effected by a swivel coupling 80 which enables the shaft 71 to be revolved in cooperation with the food holder 45 without requiring similar rotational movement of the piston rod in association with its cylinder 78. Included in the swivel coupling 80 is a shaft extension 81 which is threaded onto the end of the piston rod 79 and projects vertically downward. A connector cap 82 is threaded onto the upper end of the shaft 71 and has a central aperture for receiving a lower terminal end of the shaft extension 81. Disposed within a central cavity of the connector cap 82 is a thrust bearing 83 which is retained in association with that shaft by a cap screw 84. Accordingly, it will be seen that with the connector cap 82 threaded onto the shaft 71 to secure the thrust bearing in close relationship between opposed end surfaces, that axial extension or retraction of the piston rod 79 will be effective in obtaining vertical displacement of the pressure plate 70. The operation of the apparatus is such that a specific and constant hydraulic pressure is applied to the hydraulic ram 75 thus resulting in a constant downward force applied to the food product through the interconnected shaft 71 and piston rod 79 regardless of the quantity of food product that may be in the channel 46. Interconnection of the ram 75 into the hydraulic circuit is not illustrated other than to indicate the basic connection of the hydraulic conduits.

Further aiding in obtaining the automated operation of the grating apparatus, is the provision of a food product feeding mechanism indicated generally at 85. This feeding mechanism 85 is supported on a horizontal extension 86 of the base plate 28. This extension 86 is oriented in longitudinal alignment with the primary conveyor 10 and thus supports the feeding mechanism 85 over the conveyor in the illustrative embodiment although it will be understood that other locations of the mechanism may be provided. Included in the feeding mechanism 85 is a magazine 87 which is designed to receive a plurality of blocks of cheese or other food products C in vertically stacked relationship for utilization in a gravity feed. This magazine 87, in general, comprises vertically extending sidewalls which serve to retain the blocks of the food products in the desired vertical alignment. Mounted on the extension 86 in cooperative relationship to the magazine 87 is a hydraulic ram 88 which is mechanically coupled with a pusher plate 89. This hydraulic ram 88, which is connected into the hydraulic circuit as indicated in the schematic diagrams, includes a cylinder 90 that is secured to the extension 86 fixed relationship and includes an axially reciprocal piston rod 91.

The cylinder and piston rod 90 and 91 are oriented to result in reciprocation of piston rod 91 along a horizontal axis. Secured to the outer end of the piston rod 91 is the pusher plate 89 having a vertical area of sufficient size to interengage with the end surface at a block C of the food product. When the piston rod 91 is fully retracted to position the pusher plate 89, as illustrated in FIG. 2, the plate will be relatively spaced a distance from the outer periphery of the housing 27 to admit a block of the food product C between that plate and the end wall or peripheral outer surface of the housing.

Formed in the housing 27 in alignment with the axial path of reciprocation of the feeding mechanism 85, is an entrance opening 92. This opening 92 is of the same cross-sectional area, or slightly greater, than the cross-sectional area of a block C of the food product to thus permit sliding movement of that block into the interior of the grating chamber 36 and the channel 46 which will then be aligned with the opening. Normally closing the entrance opening 92 is a combined gate and cutting plate 93 which is supported for reciprocating movement in a vertical plane through the cooperative operation of a hydraulic ram 94. The ram 94 includes a cylinder 95 having appropriate fluid conduit connections to the hydraulic control circuit with the cylinder being mechanically secured by a bracket 96 to the housing 27. The cylinder 95 is vertically oriented and a piston rod extends vertically downward therefrom having the lower end of the piston rod 97 secured in threaded engagement with the gate and cutting plate 93. Consequently, actuation of the hydraulic ram 94 will be effective in displacing the gate 93 between the illustrated position in full lines in FIG. 3 and a vertically displaced position where the gate is fully clear of the entrance opening 92 with the gate being guided by its sliding engagement with a surface 96a of the bracket 96. Preferably, the gate and cutting plate 93 is formed with a relatively sharp lower cutting edge 98 and an arcuately curved inner surface 99 which conforms to the cylindrical interior surface 50 of the chamber 36.

Also provided in the feeding mechanism 85 is a support or bottom plate 100 for the magazine 87. This support plate 100 is carried by the pusher plate 89 at its upper horizontal edge and will thus reciprocate in conjunction with the displacement of the pusher plate. As the pusher plate 89 is projected to the right of FIG. 2, this support plate will then be pulled underneath the remaining blocks of food products C that are retained within the magazine 87. This will prevent the dropping of those remaining blocks into interfering relationship upon subsequent retraction of the pusher plate 89.

Automated operation of the apparatus and structural components as hereinbefore described is provided by a hydraulic actuating system with an incorporated electrical control circuit. The hydraulic system is illustrated in the schematic diagram of FIG. 6 with the electrical control circuit being illustrated in the schematic diagram of FIG. 7. Description of the several actuating components described in conjunction with the structure of the apparatus, defined those components as being hydraulically operated. Those components included the rotary drive motor 24 for the intermediate belt conveyor 15, a second rotary motor 62 for operation of the grating apparatus, a hydraulic ram 75 for functioning of the pressure plate in the grating apparatus, a second hydraulic ram 88 for the automated feeding mechanism, and a third hydraulic ram 94 for operating the gate to the chamber of the grating apparatus. Additionally, a fourth hydraulic ram 30 was provided to facilitate the pivoting of the grating means 14 with its associated components between an operative position and a relatively displaced position to facilitate maintenance and cleaning functions, as indicated in FIG. 4.

Figure 6:
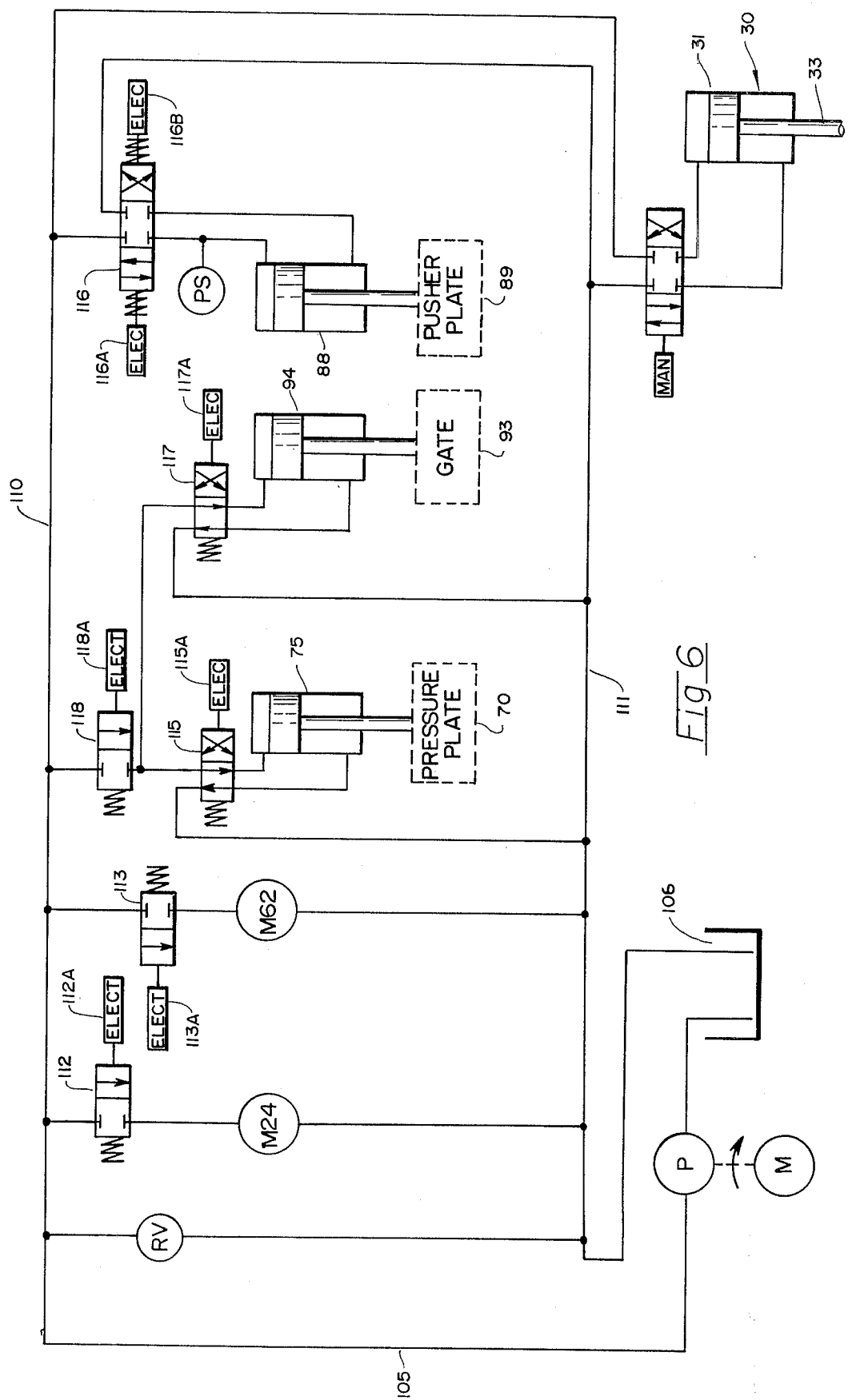
FIG. 6 is a schematic diagram of a hydraulic actuating and control circuit for the apparatus.

These hydraulic actuating devices and associated control components are diagrammatically illustrated in FIG. 6 and interconnected in a circuit for the operation thereof. This hydraulic circuit is shown as including a fluid pump P which is driven by its respective motor M, which motor may be electrically powered, for supplying hydraulic fluid in a suitable quantity and at an appropriate pressure for the operation of the several components. An inlet conduit 105 of the pump P connects with a hydraulic fluid reservoir 106 and an outlet of the pump is connected to its distribution conduit 110 having a relief valve RV providing a return to the reservoir R for preventing buildup of excessive pressure in the system. Connected to the distribution conduit 110 are the two rotary fluid motors 24 and 62 which are also connected to a return fluid conduit 111. Each of the two motors 24 and 62 is controlled for selective operation by respective valves 112 and 113. These valves are illustrated as being of the two position type and are normally spring biased to a closed position preventing fluid flow therethrough and when in that position, prevent operation of either of the respective motors. Actuation of the valves is obtained by respective electrical solenoids which are designated in drawing by the associated valve number with the subscript "a". Energization of either solenoid 112a or 113a will result in actuation of that valve to a position permitting fluid flow therethrough to the respective motor 24 or 62 for selective operation of that motor. It will be noted that these valve solenoids are also designated by the same numeral in the electrical circuit diagram of FIG. 7.

Connected to the distribution conduit 110 is the hydraulic ram 30 for effecting pivoting of the grating means. This ram 30 is controlled by a manually operated, three position valve which can be maintained in any of its three positions by a detent mechanism. This valve, in its center position, blocks fluid flow as to all ports and is thus effective as a hydraulic lock for the ram 30 to maintain that ram in its last attained position. This structural feature of the manually operated valve 114 thus provides a safety feature in preventing the inadvertent movement of the grating means during either normal operation or displacement to the cleaning position. It will also be seen that displacement of that valve to either of its other two positions will effect a displacement of the piston rod 33 in a corresponding direction with a corresponding fluid flow through the return conduit 111.

Each of the other three hydraulic rams, 75, 88 and 94, are also interconnected in the hydraulic circuit for obtaining pressurized fluid from the distribution conduit 110. These rams are also provided with a return fluid connection to the conduit 111. Operation of each ram is primarily controlled through a respective two position valve with these valves being designated by the numbers 115, 116 and 117. Each of the valves 115 and 117 is spring biased to a first position and may be selectively operated to the second position by the respective electrical actuating solenoids designated by the valve identified number with the subscript "a". Each of these valves is seen to be of the four way type to thus achieve control over the operation of the double acting hydraulic rams in either of the two directions. The valve 116 for controlling operation of the ram 88 operating the pusher plate 89 is a three position, spring centered type having two actuating solenoids 116A and 116B. An outlet or return port of each valve is connected to the return conduit 11. An inlet port of valve 116 is connected directly to distribution conduit 110. Inlet ports of the other two valves 115 and 117 are connected to the distribution conduit 110 through an interlock valve 118. This interlock valve is of a two position type which is spring biased to a normally open flow position. Operation of its associated electric solenoid 118a displaces the valve to a position where fluid flow is then blocked with respect to either of the hydraulic rams 75 and 94. Those two rams are associated with the pressure plate 70 in the grating means and the gate 93 to the grating chamber, respectively. During operation of the grating means 14 or the intermediate transfer conveyor 15, a fluid pressure is continuously applied to the ram 75 to urge the shaft 71 and pressure plate downwardly thereby applying a pressure against the food product in the channel 46. The gate 93 is also continuously urged downwardly during these operations.

Figure 7:
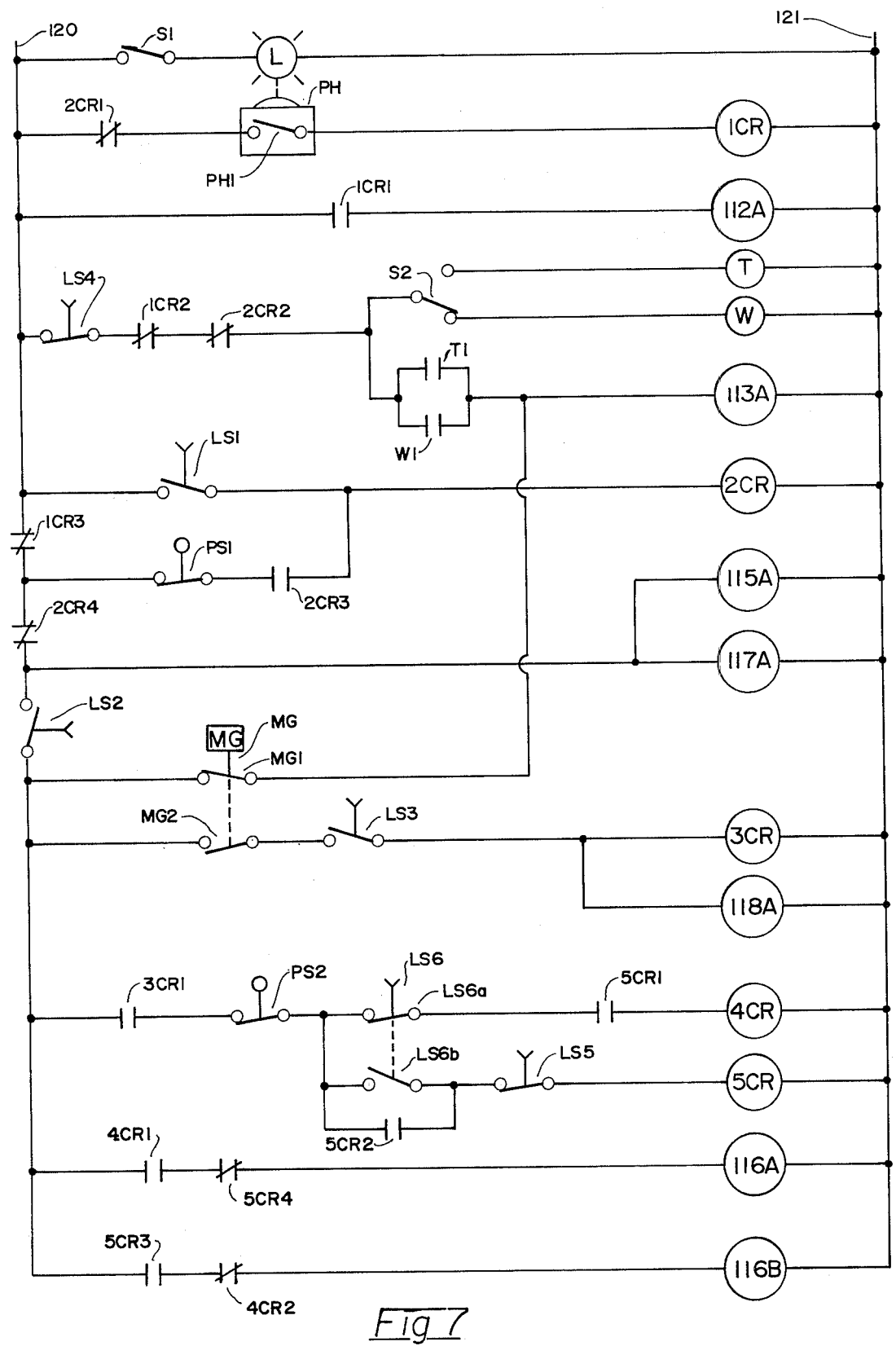
FIG. 7 is a schematic diagram of an electrical control circuit for the apparatus.

Considering next the electrical control system for effecting the automated operation of the various apparatus components in conjunction with the hydraulic actuating circuit, reference will be had, specifically, to FIG. 7 as well as the several figures showing placement of the various control switches and other components. Primary control over operation of the apparatus in depositing of food particles onto a pizza shell P is attained by a photoelectric control device. This photoelectric control device includes an electric lamp L which is connected through a control switch S1 to input electrical power conductors 120 and 121 which are connected to a suitable electrical power source (not shown). This power source may be of a low voltage type as determined appropriate for the particular equipment or it may be the normal voltage power circuit that is also provided for operation of the motor M driving the fluid pump P in the hydraulic circuit. The specifics of the power circuit for the pump motor M are not illustrated as such circuitry is well known.

The electric lamp L is mounted at one side of the primary conveyor 10 and it is positioned to direct illumination in a narrow, well defined beam transversely across that conveyor to the opposite side in a relatively close parallel relationship to the upper surface of the belt. More specifically, the lamp L may be conveniently mounted on the one plate 20 and is directed toward a photoelectric sensing device PH mounted on the opposite plate 21. Thus, it will be seen that the lamp L and the sensing device PH are relatively located to be intercepted by the movement of a pizza shell P along the conveyor 10. The operation of the sensing device PH is such that its normally open electrical contacts PH1 will be closed thereby completing an electrical circuit upon interruption of the light beam as a consequence of detecting the presence of a pizza shell in this loading area. After the pizza shell passes the beam of light, the contacts will again open and interrupt that circuit. Referring to FIG. 7, it will be seen that these contacts PH1 are connected across the power conductors for controlling operation and energization of an operating solenoid 1CR of a relay switch. That relay switch 1CR also includes the respective contacts 1CR1, 1CR2 and 1CR3, which are interconnected in other portions of the control circuit as will be described.

The electrical solenoid 112a for controlling operation of the intermediate conveyor 15 is connected across the power conductors 120, 121 through one of the relay contacts 1CR1. That contact is a normally open type and thus prevents operation of the conveyor until such time as the photoelectric sensing device PH has detected the presence of a pizza shell P at the proper location and has energized its associated relay solenoid 1CR thereby causing the contacts 1CR1 to close thus completing a circuit through solenoid 112A which is then energized.

Control over operation of the grater motor 62 is effected through its associated hydraulic valve solenoid 113a. That solenois is connected across the power conductors in series relationship with several relay and switch contacts, all which contacts are normally closed. Also serially included are switch and control contacts T1 and W1 that alternatively are quantity controlling components actuated by a timer T and a weight sensor W, respectively. These two components are parallel connected in independent circuits and are alternatively selected for operation through a manually operable switch S2 which also is connected in series circuit with the several other contacts. The timer control section T is operable to cause operation of the grater motor 62 to drive the food product holder 45 for a predetermined interval of time as may be determined sufficient to form the desired quantity of food particles that are to be deposited on the upper run of the intermediate conveyor belt 16. This timer is operable upon energization to close its contacts T1 and, upon expiration of the timed interval, will open the contacts thereby resulting in stopping of the grater motor 62. The length of the timed interval is determined by experience with a particular food product and the structural features of the mechanism and may be of the order of a few seconds or only a part of a second. It will be clearly seen that the actual time required will also be dependent upon the type of food product that is being grated, the size of the particles that are desired and the rate of speed at which the motor 62 is operated.

Alternatively a weight type of control can be utilized in providing a precise means of assuring that a predetermined quantity of the food product particles is deposited onto the intermediate conveyor. This control includes weight sensing device which includes the weight sensor W of an appropriate electrically operated type that is diagrammatically illustrated in FIG. 2 as supported in association with the upper run of the belt 16. Such weight sensing devices are well known in the food processing field and the conveyor art and are not otherwise described herein or illustrated in the drawings. It will be sufficient to understand that the weight sensor W of such a device includes the set of contacts W1 which are operable to close and complete a circuit in accordance with the preset weight or weighing requirements of the unit when the weight of food product particles is deposited on the intermediate conveyor belt 16. Contacts W1 are connected in parallel with the timer contacts T1 and in combined series relationship with the electric solenoid 113a. Consequently, closing of either the contacts, in accordance with the preselected operation of switch S2 to enable either the timer T or the weight sensor W and assuming all other contacts in that circuit, as illustrated, are also closed, a circuit would be completed for energization of the grater motor valve solenoid and operation of the motor 62 for effecting grating of the food product.

The remainder of the illustrated electrical circuit diagram provides for the interlock or intercontrol as to operation of the several components of the apparatus concerned with the automated feeding mechanism for resupplying the food product holder with another charge of the food product. This interrelationship is necessary to assure, during any feeding operation, the food product holder 45 within the chamber of the grater housing 27 will be aligned with the gate opening 92 and that the gate 93 will also be retracted upwardly to an open position. This circuitry also assures that the pressure plate 70 will be retracted to an upward position where it will not obstruct the entrance of food products within the channel 46 of the food product holder.

Elements provided for primarily detecting the interlock for the intercontrol between the several components are several sets of limit switches. A first set of such limit switches LS1 and LS2 are mounted on the one post 76 projecting upwardly from the housing 27 and are positioned to be responsive to the position of the shaft 71 carrying the pressure plate. Specifically, LS1 is positioned to be engaged by an actuating arm 125 that is clamped to the shaft 71, when that shaft has been axially displaced downwardly in accordance with the descent of the pressure plate 70 to its predetermined lowermost position. The function of this switch LS1 to detect that the channel 46 is nearly empty of the food product and to initiate the feeding operation to introduce a further quantity of the food product into the channel. Limit switch LS1 includes a normally open contact that is closed upon descent of the pressure plate 70. The second limit switch LS2, which includes a normally open contact, is also mounted on post 76 and is positioned to also be responsive to displacement of the actuating arm 125, however, LS2 is positioned to sense the approach of the shaft 71 to its uppermost position where the pressure plate 70 will be positioned immediately adjacent the web 47 of the channel 46 and therefore, in a non-obstructing position to the admittance of additional food product to the channel.

A second pair of limit switches LS3 and LS4 are mounted on the structure in operative relationship to respond to positioning of the gate 93. Limit switch LS3 is positioned to respond to the upward movement of the gate 93 to the uppermost open position at which time its normally open contact will be closed. Limit switch LS4 includes a normally closed contact and this switch is positioned so that these contacts will be opened whenever the gate 93 leaves its lowermost or closed position.

A third set of limit switches LS5 and LS6 are positioned on the horizontal extension 86 of the base plate for the grating means. The two limit switches are relatively positioned to respond to the pusher plate 89 being in either a retracted or an extended position. Limit switch LS5 has a normally open contact that is held closed when the pusher plate is in a retracted position and limit switch LS6 has a normally closed contact that is opened when the pusher plate reaches its fully extended position and a normally open contact that is closed at that time.

One other control switch is provided for responding to the feeding operation to effect complete control over an automated feeding sequence. This additional control element comprises a pressure actuated electrical switch PS having two sets of normally closed contacts PS1 and LS2. The pressure switch PS is shown in FIG. 6 interconnected in fluid pressure responsive relationship to the input conduit to the ram 88 and is operative to result in opening of its respective contacts whenever the pressure within that conduit exceeds a predetermined value. In accordance with this invention, that switch is accordingly set to respond to a fluid pressure that will be attained whenever the channel 46 has received a complete charge of the food product. A pressure responsive element is utilized in the illustrative apparatus as the structure is designed to accommodate the largest size pizza shell. The largest size pizza shell is of a larger dimension in diameter than the length of the blocks of conventionally available cheese. Consequently, it is necessary to insert more than one block of cheese during a feeding operation in recharging the channel 46 of the good product holder 45. The pressure response type of control was selected for the illustrative embodiment over dimensional or number responsive controls as the pressure responsive control is readily capable of feeding a portion of a block of cheese.

The following description of an operational sequence in the automated feeding of an additional quantity of the food product such as feeding a block or blocks of cheese into the chamber 36 of the grating means will clearly illustrate the operation of the control mechanism. During the course of normal operations, the pressure plate 70 will descend within the channel 46 until it reaches a predetermined lowermost point which is that determined as the minimum for a quantity of food product to by underlying the bottom surface of pressure plate 70 and effective in obtaining the particles of food as it is revolved against the grater plate 37. This lowermost position is sensed by the limit switch LS1 which is engaged and actuated by the arm 125. At this lowermost position, the arm 125 will thus actuate switch LS1 and close its contact which then completes an electrical circuit through the operating coil of a relay 2CR. This relay includes several contacts, one of which contacts 2CR3 is connected in a holding for maintaining the coil 2CR energized during subsequent operations in the feeding sequence. The holding circuit is necessary as it will be noted that as soon as the pressure plate 70 is caused to move vertically upward, the limit switch LS1 will open and would otherwise deenergize relay coil 2CR. Also series connected in the holding circuit with contacts 2CR3 is the set of contacts PS1 of the pressure switch. Power for continued energization of the relay 2CR through the holding circuit is obtained through a set of normally closed relay contacts 1CR3 which at this time will be closed since relay 1CR is not energized. Also, to prevent operation of the intermediate conveyor 15, a set of normally closed contacts 2CR1 controlled by the relay 2CR are maintained in an open condition in the pizza shell sensing circuit and thus prevent operation of the intermediate coveyor 15 during a feeding operation.

Accordingly, limit switch LS1 detects the need for a feeding operation and its consequent energization of relay coil 2CR results in closing of the contacts 2CR4 to provide power to the remaining portion of the feed control circuit. Closing of the contacts 2CR4 will thus be seen to also apply electrical power to the operating electrical solenoids 115a and 117a of respective fluid valves which, by reference to the hydraulic circuit shown in FIG. 6, will operate the ram 25 to elevate the pressure plate 70 and cause the gate 93 to be elevated to its open position by appropriate operation of the hydraulic ram 94.

As the shaft 71 moves axially upward and reaches its uppermost point of travel, the actuating arm 125 will engage the limit switch LS2. This switch will then be actuated resulting in closing of its contacts to connect the electrical power to the subsequent portions of the control circuit. With the switch LS2 contacts thus closed, power will be applied through a normally closed contact MG1 to the electrical operating solenoid 113a of the valve that controls the operation of the hydraulic motor 62 driving the food product holder 45. The electrical contact MG1 and its associated but electrically separate contact MG2 are incorporated in a magnetic field responsive switch device MG which is mounted on the structure and carried by the post 76 as illustrated in FIG. 3. This switch device is responsive to the proximate relationship of either of two upstanding magnetic field affecting pins 126 which are carried on the gear sprocket 67 in 180°, diametrically opposed relationship. These pins 126 are located on the gear sprocket in predetermined relationship to the longitudinal axis of the channel 46 and thus serve to provide an indication of the relative angular position of the channel. Detection of the position of the channel is necessary to assure that the channel 46 will be aligned with the gate opening 92 to enable admission of subsequent quantities of the food product. The angular relationship of the magnetic switch MG is determined in accordance with this position of the channel 46 and its desired alignment with the gate opening to result in stopping of the motor 62 and rotation of the channel 46 when the channel is properly aligned. Providing of the two pins 126 thus permits the channel to be aligned at its closest position with requiring 360° of rotation.

When the channel 46 approaches or becomes aligned with the gate opening 92, the magnetic responsive switch MG responds accordingly to the presence of a respective pin 126 and, as indicated, opens the contact MG1 to deenergize solenoid 113a and thus stop motor 62. Concurrently, the normally open contacts MG2 will be closed and complete an electrical circuit through limit switch LS3 which will also now be closed to energize an operating coil of a relay switch 3CR. The contacts of limit switch LS3 will now be closed as the gate 93, at this time, will have been raised to its upper, open position. Concurrently with energization of relay 3CR, the electrical operating solenoid 118a will also be energized and, referring to the hydraulic circuit of FIG. 6, it will be seen that the valve 118 will be actuated to a position where pressurized hydraulic fluid will be blocked with respect to either of the valves 115 and 117 and the respective hydraulic ram 75 and 94. This valve thus forms a hydraulic-electrical interlock as to the circuit to prevent further operation of either the pressure plate 70 or the gate 93 and assure that the pressure plate and gate are maintained in the raised position.

Energization of relay 3CR results in closing of a set of contacts 3CR1 which enables operation of the feeding mechanism. Series connected with contacts 3CR1 are the pressure switch contacts PS2 which are also series connected with two parallel circuits that include respective relay coils 4CR and 5CR. Interposed in the branch circuit with relay 4CR is a normally closed contact LS6a and a set of normally closed contacts 5CR1. Series connected is the other branch circuit with relay 5CR is a normally open contact LS6b and the normally open contact of limit switch LS5 which is shown as being held closed in the assumed starting position where the pusher plate 89 is fully retracted. A second contact 5CR2 which is normally open is connected in parallel to the limit switch contact LS6b to form a holding circuit for relay 5CR during retraction of the pusher plate 89. Each of the two relays 4CR and 5CR include respective contacts 4CR1, 4CR2 and 5CR3, 5CR4 that are series connected as indicated in FIG. 7 with the acting solenoids 116A and 116B of the valve controlling operation of the pusher plate 89. Alternative energization of the relays 4CR and 5CR will result in energization of a respective valve solenoid 116A and 116B for operation of the ram 88 in either extending or retracting the pusher plate 89.

With the feeding mechanism enabled by closing of contact 3CR1 and the pressure switch contacts PS2 remaining closed since there is no pressure applied to the hydraulic system as this time, a circuit is completed through limit switch contact LS6a and the contacts 5CR1 resulting in energization of relay 4CR. Relay 4CR then causes its contacts 4CR1 to close thus energizing solenoid 116A while simultaneously opening contacts 4CR2 to prevent energization of solenoid 116B. Energization of solenoid 116A operates valve 116 to cause the ram 88 to extend the pusher plate 89 in advancing the lowermost block of cheese in the magazine through the gate opening and into the channel 46. Assuming that the channel is nearly empty and that the cheese block can be advanced to an extent where the pusher plate 89 engages limit switch LS6, the contacts of the switch will be operated to open LS6a while closing LS6b. Opening of switch contacts LS6a results in deenergization of relay 4CR, opening of its contact 4CR1 with consequent deenergization of valve solenoid 116A. At this time, closing of switch contacts LS6b results in energization of relay 5CR since limit switch LS5 will have its contacts closed. Energization of relay 5CR opens contacts 5CR1 to prevent concurrent energization of relay 4CR, closed contacts 5CR2 to form a holding circuit for itself, closes contacts 5CR3 to energize valve solenoid 116B and opens contact 5CR4 to prevent energization of valve solenoid 116a. The valve 116 is thus operated to cause retraction of the pusher plate 89 to its starting position where another block of cheese will be received from the magazine. Although limit switch LS6 is now returned to its normal position, its contacts will not affect the retraction operation.

As the retraction operation is completed, the pusher plate 89 again engages the limit switch LS5 and thus opens its contacts. Opening of these contacts deenergize relay 5CR along with valve solenoid 116B and closing of contacts 5CR1. Since limit switch contacts LS6a will be closed at this time, a circuit is again completed to energize relay 4CR for advancing another block of cheese into the channel 46. This further feeding will occur if the pressure switch PS has not previously operated to open its contacts PS2. If during the course of advancing a second block of cheese into the channel 46, the pressure in the fluid circuit should increase to that pressure where its contacts will be actuated as a consequence of the channel 46 now being completely filled, the contacts PS2 will open and deenergize relay 4CR thereby stopping the feeding operation. Valve 116 will return to its spring biased center position thereby halting the ram 88 which will then maintain the pusher plate 89 in its last obtained position. Simultaneously, pressure switch contacts PS1 will also open thereby breaking the holding circuit for relay 2CR and returning control of operation to the pizza shell detection circuit. Relay contacts 2CR4 will now be open to prevent further operation of the feeding mechanism but returning the gate 93 to its closed position and again applying pressure to the ram 75 to lower the pressure plate 70 to force the cheese against the grater plate 37.

When the quantity of cheese in the channel 46 is again depleted to the extent that limit switch LS1 is actuated, the foregoing feeding operation will be repeated. If the pusher plate 89 was previously left in an intermediate position, between fully extended or fully retracted, its operation will be continued upon closing of relay contact 3CR1 since limit switch contact LS6a will be closed as is relay contact 5CR1 thus resulting in energization of relay 4CR. This results in continued extension of the pusher plate 89 which had only partially advanced a block of cheese into the channel 46.

Operation of the illustrative apparatus as herein described, while not shown incorporated in a complete processing line other than associated with an interconnecting conveyor 10, will be understood to be with other apparatus performing separate and distinct functions in producing pizzas with many varied topping applications. Sauces and meats in sliced form would be applied in addition to the grated cheese and these other products may be applied in either preceding or following relationship to the cheese application. Additional controls may be provided to maintain the cheese grating apparatus operating in timed relation to the advancement of the pizza shells on the primary conveyor to assure that the pizza shells will be provided in sequentially spaced relationship that will enable the apparatus to apply grated cheese to each shell.

It will also be understood from this description of an illustrative embodiment, that this apparatus may also be readily adapted to and utilized with other food products in the application thereof as shredded or grated particles to any selected receiver. Various types of grater plates may be inserted in the apparatus for obtaining the desired particle size and configuration or shape. Also, a grater plate may be formed with different shaped upwardly projecting elements and these elements with their associated apertures may be arranged in many different patterns. These variations would be determined by the specific desired pattern of food particles to be formed on the intermediate conveyor and ultimately deposited on the receiver.

As will be readily apparent from the foregoing detailed description of an embodiment of this invention, a particularly novel apparatus and method is provided for the formation and application of food product particles to the surface of a receiver. Utilization of an intermediate conveyor for initial receipt of the food particles enables those particles to be ultimately deposited on the receiver in an optimum pattern that can be precisely controlled as to surface area and layer thickness. This apparatus and method is particularly adapted to automated processing lines and is of efficient and consistently reliable operation to assure a uniformly high quality product with substantially enhanced economics of operation through minimization of waste of the food product that is thus applied.

Having thus described this invention, what is claimed is:

1. A method for depositing a layer of food product particles onto an upper surface of a food product to be coated comprising the steps of continuously displacing said food product along a prescribed path having a food particle application station supported vertically thereover whereby a predetermined quantity of food product particles can be applied to the food product, forming the predetermined quantity of food product particles at the particle application station and permitting the particles thus formed to drop by gravity onto an underlying support, thereafter receiving the quantity of formed food product particles in a layer as they are dropped and maintaining the particles thus received in such layer and supporting them in a relatively fixed position for at least the time that the predetermined quantity of particles is being formed and disposed vertically above the path of movement of the food product to be coated, and thereafter discharging the food product particles from the said support onto the moving food product as it passes the application station by displacing the layer of particles along a path parallel to the path of movement of the food products toward a discharge line and serially discharging the layer of particles in timed relationship to the movement of the food product to deposit the particles by gravity onto the food product, thereby selectively controlling the formation of the desired particle pattern and layer thickness.

2. The method of claim 1 in which the food product particles are formed in a predetermined pattern relative to a planar surface and are received and held in the layer in the same said pattern.

3. The method of claim 2 in which the food particles are discharged onto the food product in the same pattern as received in the layer.

4. The method of claim 1 in which the food particles are displaced toward the discharge line at the same rate as the food product is displaced along its path.

5. The method of claim 1 in which the food particles are displaced toward the discharge line in the same direction as the food product is moved.

6. The method of claim 1 in which the food product is a pizza shell and the food particles are grated cheese.

* * * * *